United States Patent [19]

Ito

[11] Patent Number: 5,081,668
[45] Date of Patent: Jan. 14, 1992

[54] RADIO TELEPHONE SYSTEM HAVING RECORDING AND REPRODUCTION FUNCTIONS

[75] Inventor: Koichi Ito, Hino, Japan

[73] Assignee: Kabushiki Kaisha Toshiba, Kawasaki, Japan

[21] Appl. No.: 493,949

[22] Filed: Mar. 15, 1990

[30] Foreign Application Priority Data

Mar. 16, 1989 [JP] Japan ............................ 1-64852

[51] Int. Cl.$^5$ .................... H04M 11/00; H04M 1/64
[52] U.S. Cl. ........................ 379/58; 379/61;
379/63; 379/68; 379/79; 379/80
[58] Field of Search ............... 370/30; 379/56, 58,
379/61, 62, 63, 67, 96, 98, 121, 375, 413, 424,
430, 68, 69, 70, 79, 80, 57, 59; 455/83, 90, 99

[56] References Cited

U.S. PATENT DOCUMENTS

| 4,037,053 | 7/1977 | Müller | 379/79 |
| 4,481,382 | 11/1984 | Villa-Real | 379/68 |
| 4,500,752 | 2/1985 | Lee | 379/63 |
| 4,514,593 | 4/1985 | Hattori et al. | 379/80 |
| 4,881,259 | 11/1989 | Scordato | 379/58 |
| 4,903,289 | 2/1990 | Hashimoto | 379/61 |
| 4,910,761 | 3/1990 | Shimura et al. | 379/61 |

FOREIGN PATENT DOCUMENTS 60-25623 12/1985 Japan .
61-24335 3/1986 Japan .
63-22172 9/1988 Japan .
2180122 3/1987 United Kingdom .

OTHER PUBLICATIONS

J. C. Penney Catalog copyright 1989, p. 707 #8 #9.
DAK Catalog copyright 1990, p. 50.

Primary Examiner—James L. Dwyer
Assistant Examiner—William Cumming
Attorney, Agent, or Firm—Finnegan, Henderson, Farabow, Garrett, and Dunner

[57] ABSTRACT

A radio telephone system having a charger separated from a base unit and connectable to a radio telephone to provide power thereto, and a recording and reproducing circuit separated from the radio telephone and the base unit to record and reproduce a voice signal. The voice signal representing a telephone call from the subscriber line is transmitted from the base unit via the charger to the recording and reproducing circuit for the voice signal to be recorded therein. The recorded voice signal can be reproduced and played through a speaker in places detached from the base unit. The radio telephone system includes a mode selector to set the system either in an automatic answering mode or a reproduction mode. Even when the battery power of the radio telephone runs out, the recording and reproducing circuit can still reproduce the recorded voice signal where an alternating current power outlet is available for the charger to provide power to the recording and reproducing circuit.

19 Claims, 9 Drawing Sheets

RADIO TELEPHONE SYSTEM HAVING RECORDING AND REPRODUCTION FUNCTIONS

BACKGROUND OF THE INVENTION

1. Field of the Invention

The present invention relates to improvements to radio telephone devices with an automatic answering function.

2. Description of the Related Art

As the use of telephone devices such as cordless telephone devices increase, it is demanded that such devices; have an automatic answering function. In response to this, radio telephone devices with an automatic answering function has been proposed. Such a radio telephone device has been disclosed, for example, in Japanese Patent Applications Sho Nos. 59-144366, 112375, and 62-55545.

FIG. 1 is a block diagram of a portion of such a radio telephone device related to the automatic answering function, as shown in the Application '545. This radio telephone device includes a base unit 1 and a radio telephone 2 with the base unit 1 being connected to a cable telephone line 3. The base unit 1 includes a radio telephone line connection determining means 84, a recording guide sending means 85, a recording control means 86, and a recording means 87 for realizing the automatic answering function.

In the arrangement, when an automatic answering mode is set in the base unit 1 and there is no need for calling the radio telephone 2, or when the radio line connection determining means 84 determines that a radio line cannot be established between the base unit and the radio telephone 2, the determining means 84 generates a determination output signal which operates the recording guide sending means 85 to thereby send a guiding voice signal to the cable telephone line 3. If the sending of the voice signal is completed, the recording control means 86 is operated so as to record the an addressee's voice with the recording means.

The radio telephone devices disclosed in the Publications '366 and '375 are also constructed such that the base unit record the addressee's voice.

In this arrangement where the base unit 1 records the addressee's voice in an automatic answering mode, recording of the voice during the automatic answering made possible even if the battery in the radio telephone 2 is used up because the base unit 1 operates with a commercial AC power source.

However, since the recording means 87 is provided in the base unit 1, the speaker (not shown) in the base unit 1 must broadcast the recorded voice in order to be heard.

Since the base unit 1 is connected to the cable telephone line 3, the position of its installation site is limited. For example, in order to hear the recorded voice, it is necessary for the addressee to go to the base unit 1. Therefore, it is very inconvenient to ascertain the recorded matters.

SUMMARY OF THE INVENTION

It is an object of the present invention to provide a radio telephone device which allows a matter recorded during absence to be ascertained at a desired place.

The present invention includes a charger separated from the base unit and connected electrically to the radio telephone for charging a battery in the radio telephone, and a recording and reproducing circuit separated from the radio telephone and the base unit and supplied with an operating power source voltage from the charger for recording and reproducing the voice signal.

The radio telephone or the recording and reproducing circuit includes mode switching means for selecting an automatic answering function mode. In the operating mode a signal indicative of the addressee's voice received from the base unit is transmitted via the charger to the recording and reproducing means for recording purposes.

Therefore, the recorded matter can be reproduced and ascertained in any place where a power supply including a commercial AC power source for the charger is available. In this case, since the battery for the radio telephone is not used, the recorded matter can be ascertained irrespective of the state of consumption of the battery.

DESCRIPTION OF THE PREFERRED EMBODIMENTS

Figure 2:
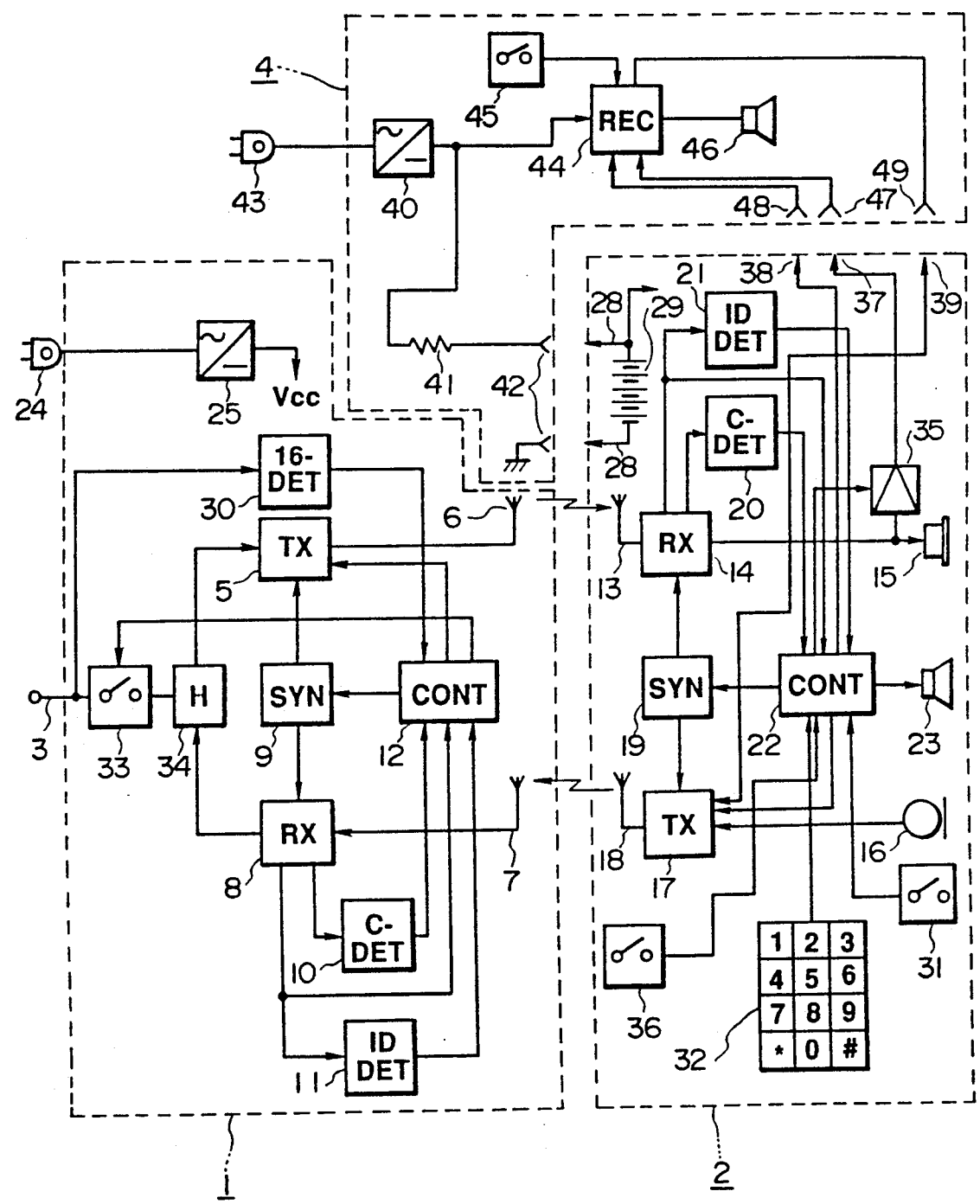
FIG. 2 is a block diagram of one embodiment of a radio telephone device according to the present invention.

FIG. 2 is a block diagram of one embodiment of the present invention. In FIG. 2, a base unit 1 is connected via a radio circuit to a radio telephone 2 and to a cable telephone line 3. The radio telephone 2 is placed on a charger 4 which charges a battery 29 for the radio telephone 2 and which is provided separately from the base unit 1 and radio telephone 2.

A signal from the cable telephone line 3 is used as a modulating input to a transmitter 5 via a line switch 33 and a hybrid circuit 34. The electric waves modulated by the transmitter 5 are radiated from an antenna 6 toward the radio telephone 2.

The radiated electric waves from the radio telephone 2 are received by a reception antenna 7 and demodulated by a receiver 8. The demodulated signal from the receiver 8 is transmitted to the cable telephone line 3 via the hybrid circuit 34 and line switch 33.

A synthesizer 9 of the base unit 1 outputs a signal of a frequency corresponding to a radio channel (including a speech channel and a control channel) to the transmitter 5 and receiver 8. In the particular embodiment, the number of control channels constituting the radio channel is one and the number of speech channels is plural. The control channel may be composed of a plurality of channels.

The output of the receiver 8 is input to a reception field detector 10 in order to determine an electric field strength. The detector 10 may be either a carrier squelch circuit or a noise squelch circuit. Another output from the receiver 8 is provided as a data signal contained in the demodulated received waves to an identification signal detector 11 which checks an identification signal (ID code) determined by a combination of the base unit 1 and radio telephone 2.

The outputs from the detectors 10 and 11 and the demodulated version of the data signal are input to a control circuit 12 for use in connection control. The control circuit 12 controls the synthesizer 9 to select a radio channel and sends the data signal as a modulating input to the transmitter 5. Reference numeral 30 denotes a call signal detector which detects a call signal of 16 Hz from the cable line 3 and which outputs a detection signal, indicative of that detection, to the control circuit 12. A power source system for the base unit 1 is constructed such that a commercial AC voltage of 100 V is converted to a DC Vcc by a rectifying and stabilizing circuit 25 and that the DC voltage Vcc is used for power supplies of the respective circuits.

Similarly, the radio telephone set 2 includes a reception antenna 13 and a receiver 14 the demodulated output of which is provided to an earpiece 15. The voice from a mouthpiece 16 is supplied as a modulating input to the transmitter 17 which radiates the modulated carrier via an antenna 18.

A synthesizer 19, a reception field detector 20, an identification signal detector 21 are similar to those provided in the base unit 1. A control circuit 22 provides entire control of the radio telephone 2. A speaker 23 is a sounder which generates a ringing tone when there is an incoming call.

Reference numeral 31 denotes a hook switch; 32, a dial key pad unit; 35, an amplifier which amplifies an addresser's voice signal received by the receiver 14; 36, a mode setting switch which sets an automatic answering mode; 37, a recorded voice output terminal; 38, a recording control terminal; and 39, a message terminal which sends a guidance message, provided by the operation of the automatic answering function, to the addresser.

Each of the circuits of the radio telephone 2 is supplied with power by the battery 29. For this battery, when the radio telephone 2 is placed on the charger 4, the charging terminals 28 of the radio telephone and the charging terminals 42 of the charger are coupled electrically, so that the DC output voltage from the rectifying and stabilizing circuit 40 is supplied via a current limiting resistor 41 to the battery 29 for charging purposes.

Figure 1:
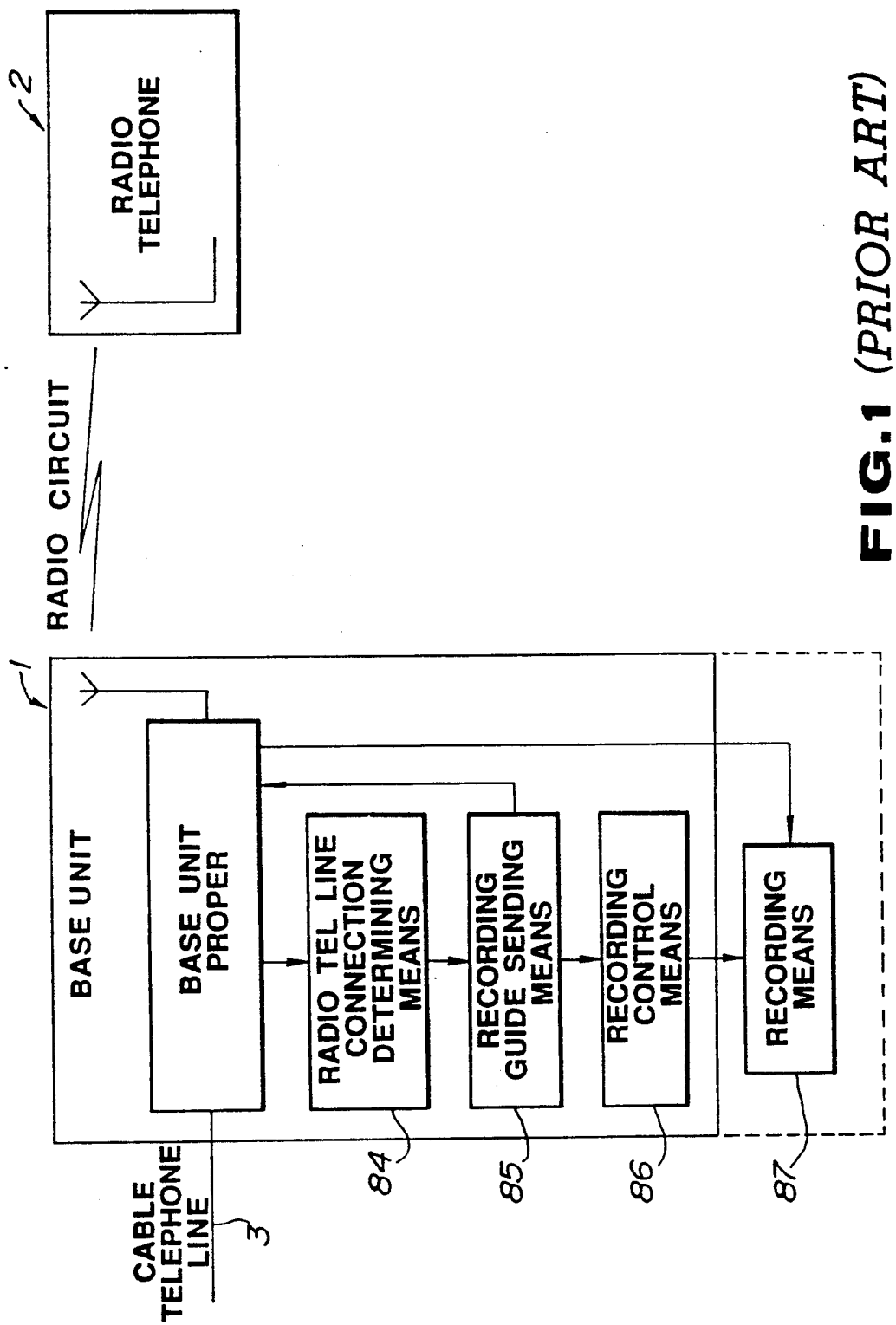
FIG. 1 is a schematic block diagram of a conventional radio telephone device with an automatic answering function.

The charger 4 includes the rectifying and stabilizing circuit 40 which rectifies a commercial AC voltage of 100 V via a AC plug 43 to provide a DC voltage which is used to charge the batter 29 for the radio telephone 2; a recording and reproducing circuit 44 operated with a DC output from the stabilizing circuit 40 for recording an addresser's voice and for sending to the addresser a reproduced guiding message in the automatic answering mode; a reproducing switch 45; a speaker 46; and a set of terminals, i.e., a recorded voice input terminal 47, a recording control terminal 48, and a message input terminal 49 which are coupled to the recorded voice output terminal 37, recording control terminal 38, message terminal 39, respectively, of the radio telephone when the radio telephone 1 is placed on the charger 4. The recording and reproducing circuit 44 includes recording guide sending means, recording control means, and recording means such as those shown by 85, 86 and 87, respectively, in FIG. 1.

Figure 3A:
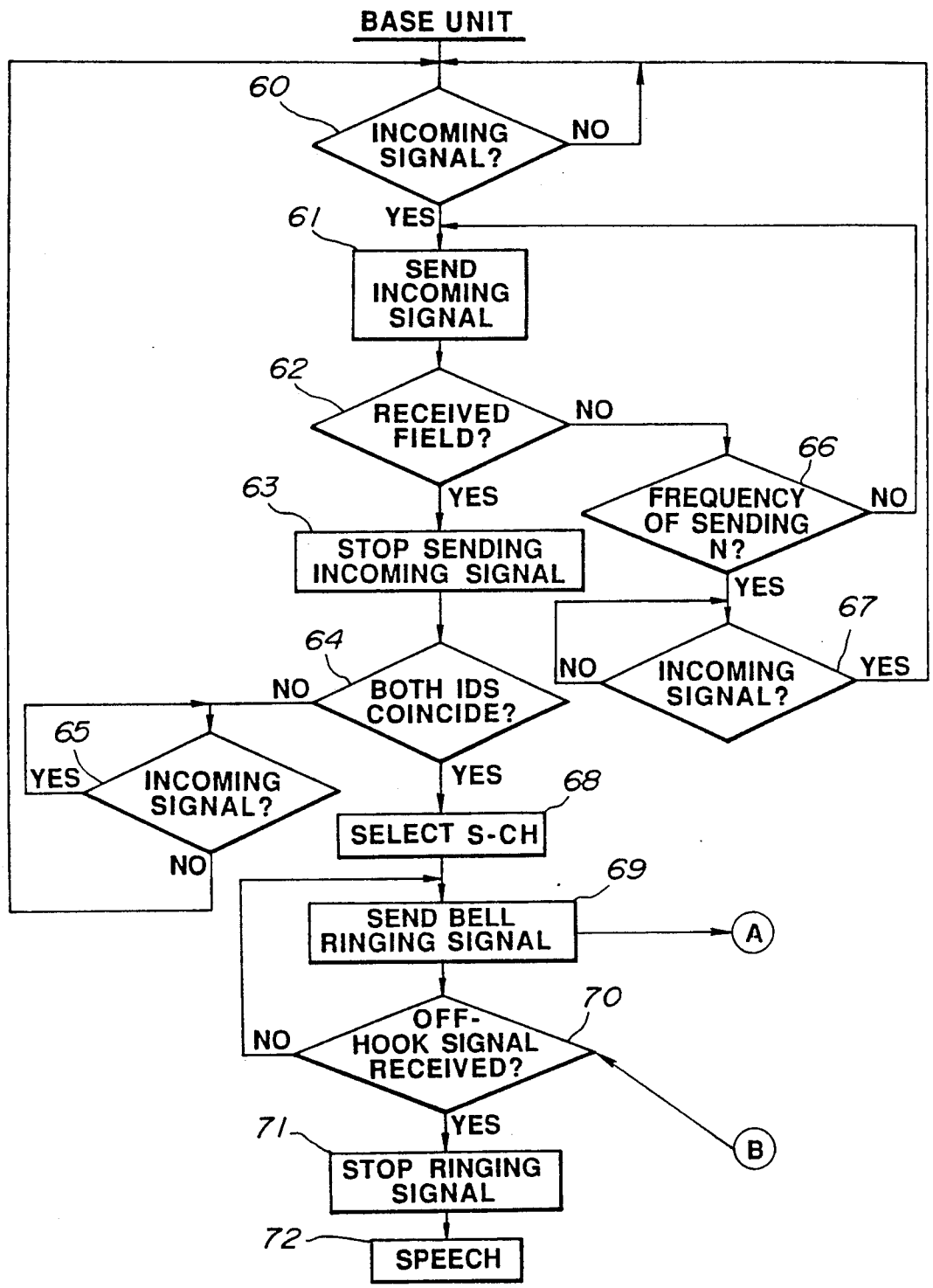
FIG. 3A is a flow chart associated with the operation of the base unit according to the embodiment of FIG. 1 when there is an incoming call.
Figure 3B:
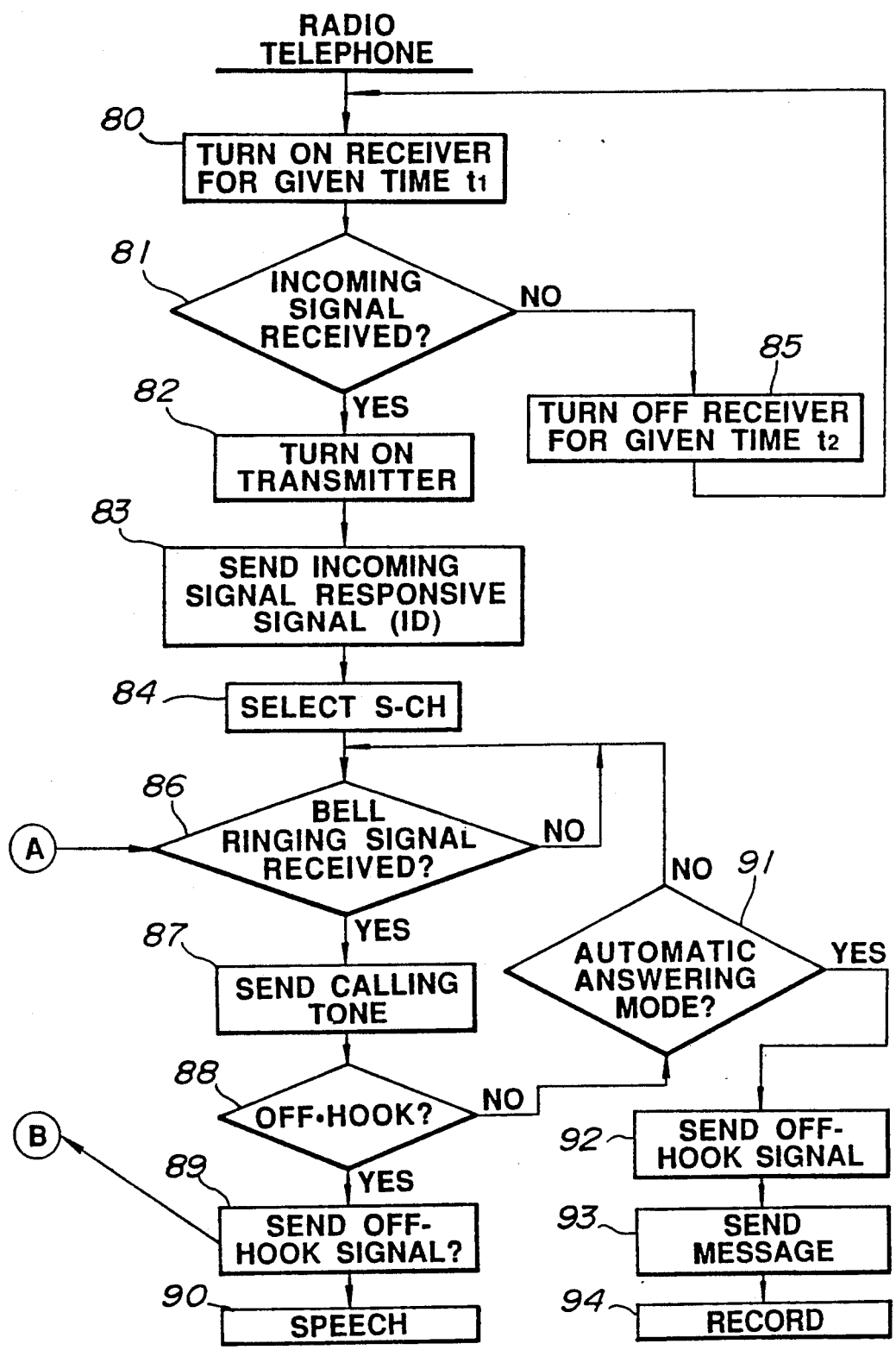
FIG. 3B is a flow chart associated with the operation of the radio telephone according to the embodiment of FIG. 1 when there is an incoming call.

FIGS. 3A and 3B are flowcharts indicative of the operation of the base unit and the radio telephone device operated, respectively when there is an incoming call from the cable telephone line 3. The operation of the embodiment of FIG. 2 will now be described with reference to these flowcharts.

First, when the base unit 1 in its standby state detects a call signal from the cable telephone line 3 using the call signal detector 30 (step 60), it checks whether there is any idle one among the control channels C-CH. If so, it sets the oscillating frequency of the synthesizer 9 at the control channel frequency, and turns on the transmitter 5 to thereby cause same to transmit the incoming signal (step 61). In this case, the incoming signal includes a signal designating a speech channel S-CH.

On the other hand, the radio telephone 2 turns on the synthesizer 19 for a given time t1 set in a timer (not shown) in a standby state, sets its oscillating frequency at the control channel frequency, and turns on the receiver 14 (step 80). When an incoming signal is received at this time (step 81), the telephone 2 turns on the transmitter 17 (step 82) to thereby cause same to send an incoming signal responsive signal including an identification signal (ID code) for identifying the telephone 2 itself (step 83), and selects a designated speech channel S-CH (step 84). If no incoming signal is received, the synthesizer 19 and the receiver 14 are turned off for a predetermined time t2 (step 84). The intermittent reception by turning on and off the receiver is referred to as battery saving.

The average current I consumed during the standby is $I=(1/t1+t2)(t1\ Ion+t2\ Ioff)$ where Ioff is the current consumed when the receiver 14 is off, and Ion is the current consumed when the receiver 14 is on. Since usually Ion>Ioff, the current I is reduced.

When the base unit 1 detects electric waves from the radio telephone 2 using the reception field detector 10 (step 62), it stops sending the incoming signal (step 63). If no electric waves from the radio telephone 2 are detected at this time, the base unit continues to send the incoming signal up to n times (step 66). The reason why transmission of the incoming signal up to the predetermined number of times is that the radio telephone 2 is in an intermittent reception, so that it cannot receive any signals during the time t2. The reason why closing any more transmission after n times of transmission is to avoid useless occupation of the control channel, for example, when the power source for the radio telephone set 2 is off or when the radio telephone set 2 is placed at an exessively great distance from the base unit.

When the ID code contained in the incoming signal responsive signal from the radio telephone 2 coincides with the preset ID code (step 64), the base unit selects the S-CH designated by the incoming signal is selected (step 68). If there is no coincidence, there may be an incoming signal responsive signal from another radio telephone, so that the base unit waits until the call from the cable telephone line 3 disappears (step 65), and the base unit returns to its standby state.

After selecting the S-CH, the base unit 1 sends a bell ringing signal (step 69). When the radio telephone 2 receives it (step 86), it sends a ringing tone from the sounder 23 (step 87). Upon subjecting to the off-hook operation by an off-hook switch 31 in response to the ringing tone (step 88), the radio telephone 2 sends an off-hook signal (step 89) and is placed into a telephone communication state (step 90).

When the base unit 1 receives the off-hook signal (step 70), it stops sending the bell ringing signal (step 71), and closes the line switch 33 to form a speech loop with the cable telephone 3 to thereby bring about a telephonic communication state (step 72).

When the base unit 1 finds that the frequency of transmissions of the incoming signal has reached n (step 66) and detects that the incoming signal from the cable telephone line has disappeared (step 67), it returns to its standby state to thereby prevent the repetition of unnecessary incoming operations. The above involves the incoming operation.

If no off-hook operation by the hook-switch 31 is performed when the ringing tone is generated in the radio base 2, the telephone 1 checks whether the automatic answering mode has been selected by the switch 36. If so, the control circuit 22 sends an off-hook signal from the transmitter 17 to thereby bring about a telephonic communication state between the base unit 1 and radio telephone 2 (step 92). Thereafter, the control circuit 22 controls the recording and reproducing circuit 44 in the charger 4 via the recording control terminals 38 and 48 so as to select a reproduction state to thereby reproduce a guiding message recorded beforehand. A voice signal indicative of the guiding message is input to the transmitter 17 via the terminals 49 and 39 and sent by the transmitter 17 to the base unit 1 via a speech channel and, in turn, sent to the addresser via the line switch 33 of the base unit 1 (step 93). When there is an incoming voice signal from the addresser in response to the guiding message, the control circuit 22 places the recording and reproducing circuit 44 in its recording state, and inputs a signal indicative of the addresser's voice obtained from the output of the amplifier 35 to the recording and reproducing circuit 44 via the terminals 37 and 47 for recording purposes (step 94).

The reproduction mode is selected by turning on the reproduction switch 45. In the reproduction mode, the addresser's voice thus recorded is reproduced from the recording and reproducing circuit 44 and ascertained via the speaker 46. This ascertaining is possible in any place where a commercial AC voltage is available via the AC plug 43.

Therefore, a troublesome action to come near a place where the base unit 1 is set and to ascertain the recorded matter as is the case with the prior art device is not required and an automatic answering function which uses the feature of the portability of the radio telephone 2 can be carried out.

While in the above embodiment the recording and reproducing circuit 44 and speaker 46 for recording and reproducing purposes are disposed as a unit in the charger 4, recording and reproducing a message is possible without using the voltage of the battery 29 in the radio telephone set 2 if the operating power source voltage (DC voltage) is supplied from the charger 4. Therefore, the recording and reproducing function may be provided separately outside the charger 4 such that it is connected via a connectable cable, including a power supply line, a voice signal line and a recording and reproducing control line, to the charger 4.

Figure 4:
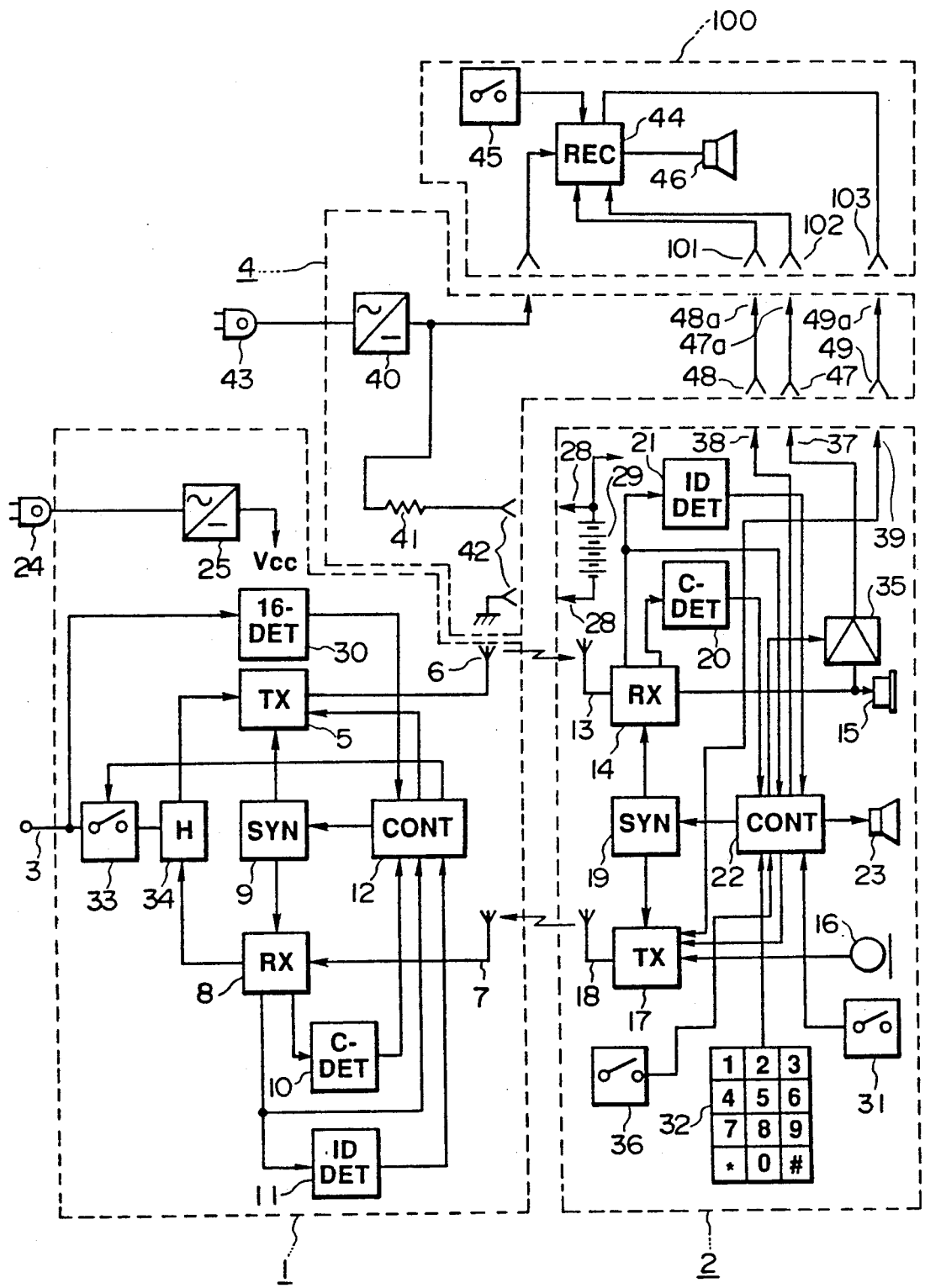
FIG. 4 is a block diagram of another embodiment of the present invention in which a recording and producing device is provided separately from the charger.

FIG. 4 shows another embodiment of the present invention having such structure in which recording and reproducing device 100 which includes a recording and reproducing circuit 44, a reproduction switch 45, and a speaker 46 is provided separately from the charger 4. A recording control signal from the control circuit 22 of the radio telephone 2 is applied to the recording and reproducing circuit 44 via the terminal 38 of the radio telephone 2, terminals 48 and 48a of the charger 4, and a terminal 101 of the recording and reproducing device 100. The output from the amplifier 35 of the radio telephone 2 is applied to the recording and reproducing circuit 44 via the terminal 37 of the radio telephone 2, terminals 47 and 47a of the charger 4, and a terminal 102 of the recording and reproducing device 100. The guiding message output from the recording and reproducing circuit 44 of the recording and reproducing device 100 is applied to the transmitter 17 of the radio telephone 2 via a terminal 103, terminals 49a and 49 of the charger 4, and a terminal 39 of the radio telephone 2. The remaining structure is similar to the corresponding one in FIG. 2. By such arrangement, the recording and reproducing device 100 is constructed removably from the charger 4.

While in the embodiments of FIG. 2 and 4 the automatic answering mode setting switch 36 is provided in the radio telephone 2, it may be provided either in the charger 4 or in the recording and reproducing device 100 separated from the charger 4.

Figure 5:
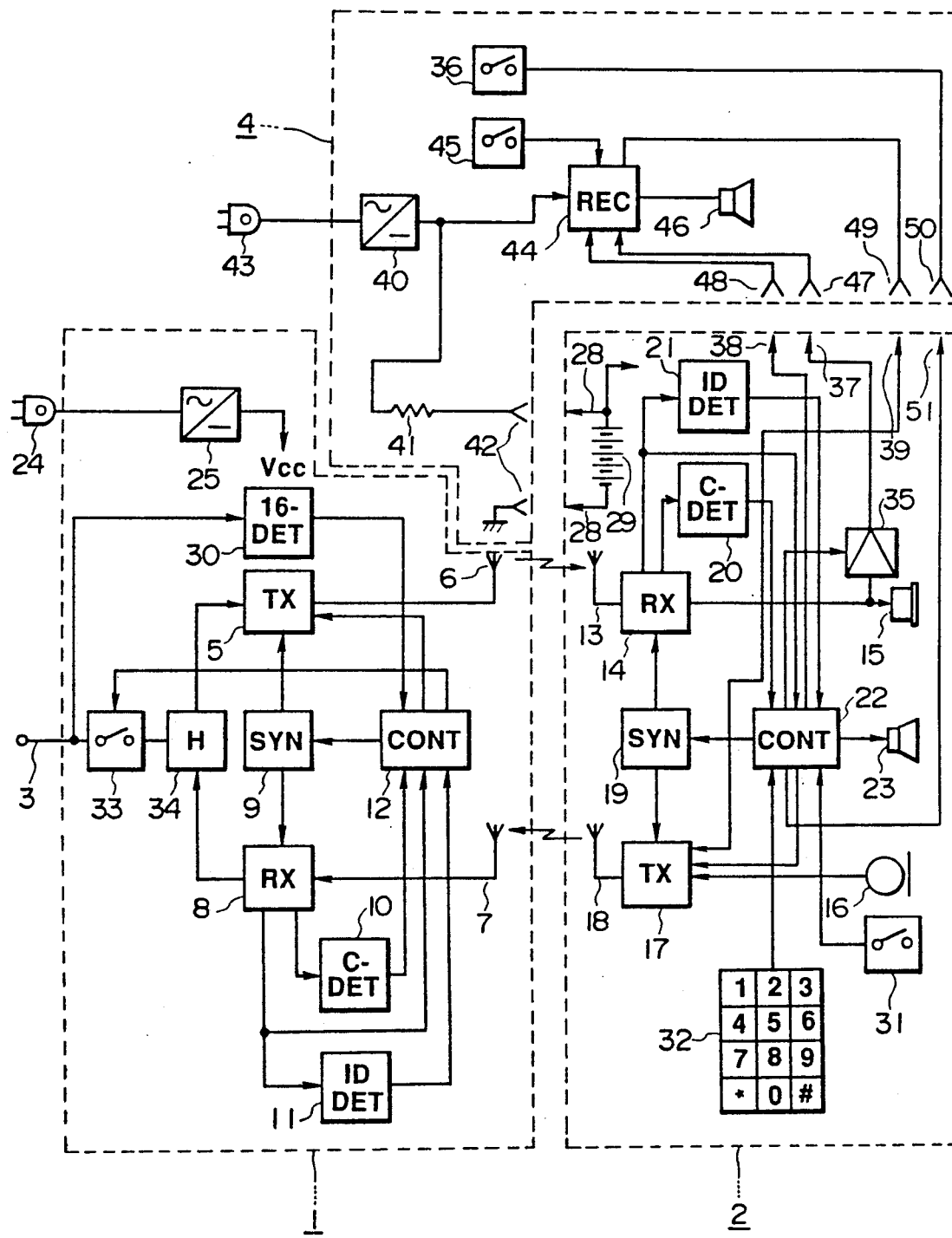
FIG. 5 is a block diagram of a further embodiment of the present invention in which an automatic answering mode setting switch is provided in the charger.
Figure 6:
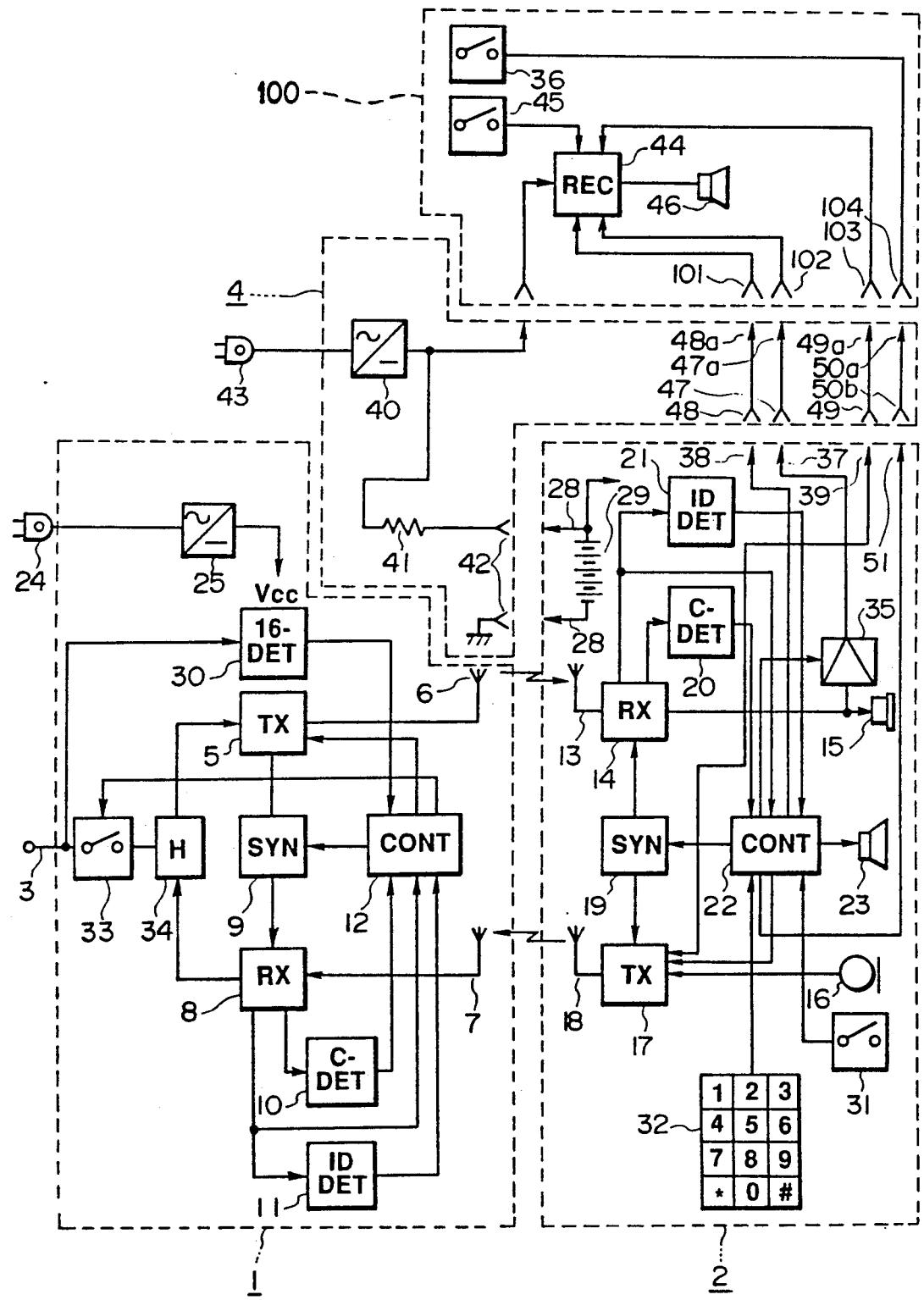
FIG. 6 is a block diagram of a still further embodiment of the present invention in which an automatic answering mode setting switch is provided in a recording and reproducing device.

FIGS. 5 and 6 each show yet another embodiment of the present invention. In the arrangement of FIG. 5, the automatic answering mode setting switch 36 is provided in the charger 4 and provides its output to the control circuit 22 of the radio telephone 2 via the terminal 50 of the charger 4, and via a terminal 51 of the radio telephone 2. In the arrangement of FIG. 6, the automatic answering mode setting switch 36 is provided in the recording and reproducing device 100. The output from the automatic answering mode setting switch 36 is applied to the control circuit 22 of the radio telephone 2 via the terminal 104 of the recording and reproducing device 100, terminals 50a and 50b of the charger 4, and terminal 51 of the radio telephone 2. The remaining structure is similar to the corresponding one in FIGS. 2 and 4. According to such arrangement, the setting of the automatic answering mode is possible either in the charger 4 or in the recording and reproducing device 100.

Figure 7:
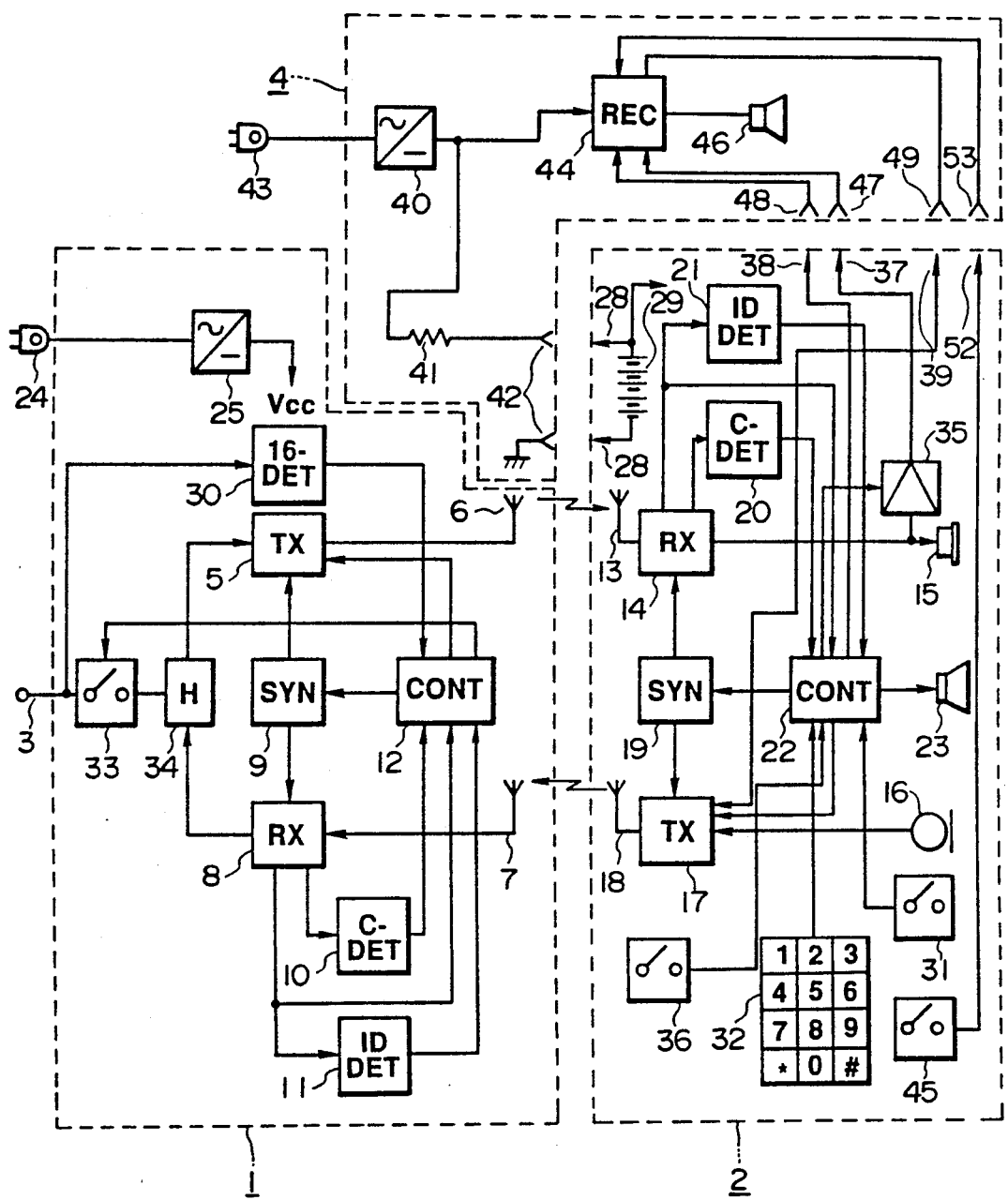
FIG. 7 is a block diagram of a still further embodiment of the present invention in which the reproduction switch is provided in the radio telephone.

The reproduction switch 45 may be disposed similarly in the radio telephone 2. FIG. 7 shows yet another embodiment of the present invention in which the reproduction switch 45 is provided in the radio telephone 2. In the arrangement, the output of the reproduction switch 45 is applied to the recording and reproducing circuit 44 of the charger 4 via the terminal 52 of the radio telephone 2 and the terminal 53 of the charger 4. The remaining structure is similar to the corresponding one shown in FIG. 2. According to such arrangement, the reproducing operation is possible in the radio telephone 2.

Figure 8:
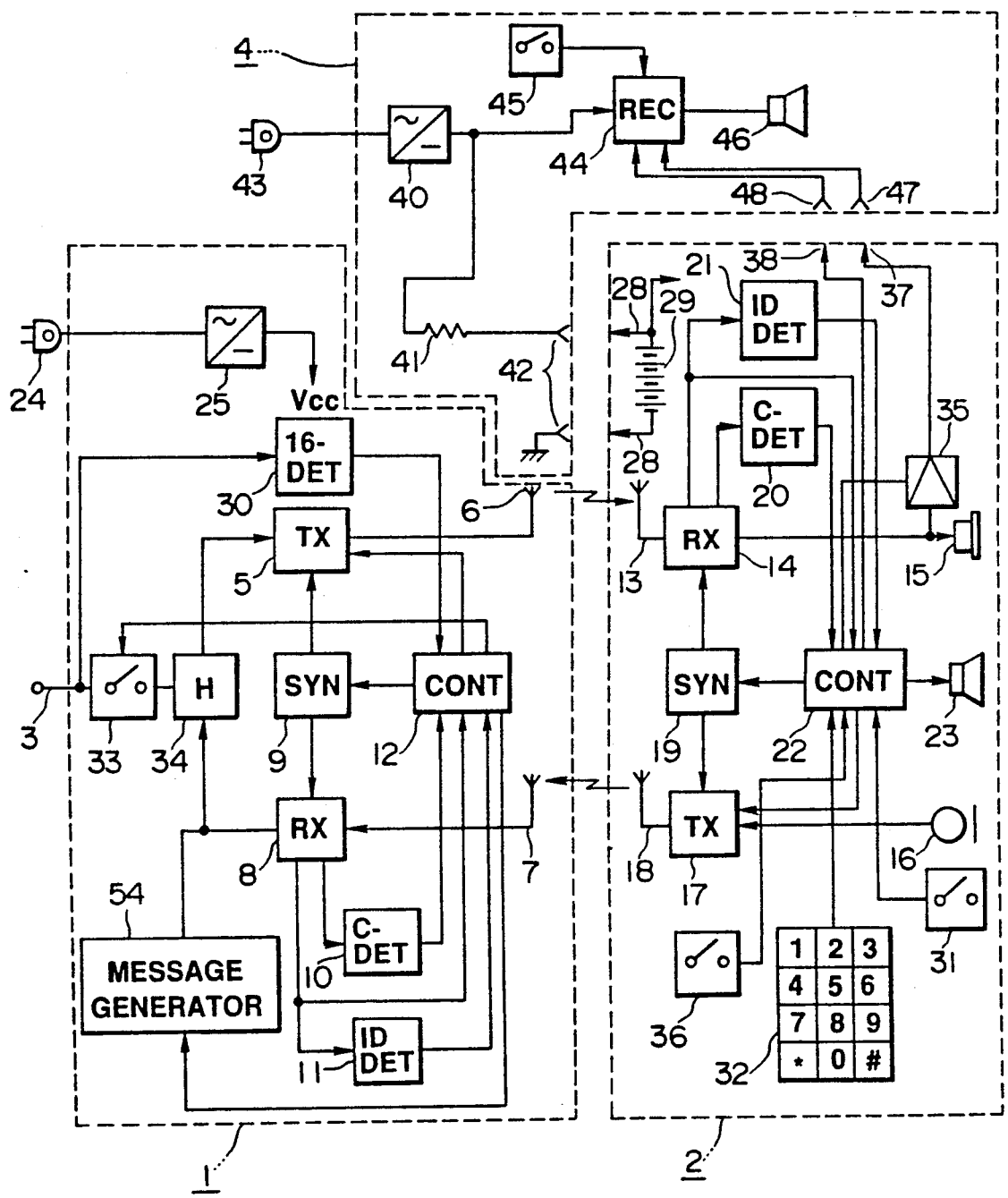
FIG. 8 is a block diagram of a still further embodiment of the present invention in which a message generator is provided in the base unit.

While in the above embodiment the guiding message is reproduced by the recording and reproducing circuit 44, a message generator in an integrated circuit may be provided in the base unit 1. FIG. 8 illustrates yet another embodiment of the present invention having such structure in which the guiding message is supplied from the message generator 54 of the base unit 1 to the addresser via the hybrid circuit 34 and line switch 33. The message generator 54 is controlled by the control circuit 12 of the base unit 1. In this arrangement, the circuit to generate a guiding message is eliminated from the recording and reproducing circuit 44.

If the automatic answering mode has been selected by the automatic answering mode setting switch 36 in the above embodiments, tones, such as a ring back tone, from the addresser one input as recorded signals to the recording and reproducing circuit 44 via the amplifier 35. Therefore, by employing an arrangement in which, signals such as a recorded signal, are broadcasted simultaneously from the speaker 46, the on-hook call origination is possible, which includes a call origination, without picking up the handset until the addresser responds to the dialing operation after the off-hook operation.

What is claimed is:

1. A cordless telephone system comprising:
a base unit coupled to a telephone subscriber line for receiving a speech signal therefrom, and wirelessly transmitting the speech signal over a radio channel;
means for setting the system either in an automatic answering mode or a reproduction mode;
a charger unit including:
an input terminal connectable to an alternating current power source,
a converter for converting alternating current power to direct current power,
an output terminal for providing direct current power, and
a recording and reproducing means, detachable from the base unit, connectable to said converter and coupled to the mode setting means, for recording the speech signal during the time when the system is in the automatic answering mode and for reproducing the speech signal during the time when the system is in the reproduction mode; and
a mobile unit wirelessly connectable to the base unit including:
a rechargeable battery connectable to the charger unit for providing power to the mobile unit,
means for receiving the speech signal wirelessly transmitted over the radio channel, and
means coupled to the receiving means for controlling transmission of the speech signal to the recording and reproducing means during the time when the system is in the automatic answering mode.

2. The cordless system of claim 1, wherein the base unit includes means for establishing a speech communication radio link with the mobile unit in response to an incoming call from the subscriber line, wherein the recording and reproducing unit includes means for generating a guiding message, and wherein said control means includes means for transmitting the guiding message to the subscriber line through the speech communication radio link in response to the incoming call during the time when the system is in the automatic answering mode.

3. The cordless telephone system of claim 1, wherein the mode setting means includes a first switch for setting the system in the automatic answering made and a second switch for setting the system in the reproduction mode.

4. The cordless telephone system of claim 3, wherein the first switch is in the mobile unit.

5. The cordless telephone system of claim 3, wherein the second switch is in the charger unit.

6. The cordless telephone system of claim 3, wherein the first switch is in the charger unit.

7. The cordless telephone system of claim 3, wherein the second switch is in the mobile unit.

8. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and electrically connectable to the radio telephone, for providing battery charging power to the radio telephone;
a recording and reproducing means in said charger, detachable from the base unit and the radio telephone, and electrically connectable to the radio telephone, for recording and reproducing a voice signal; and
means, coupled between the base unit and the recording and reproduction means, for controlling transmission of said voice signal representing a telephone call from the base unit to the recording and reproducing means to be recorded therein.

9. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and electrically connectable to the radio telephone, for providing battery charging power to the radio telephone;
a recording and reproducing means, detachable from the base unit and the radio telephone, and connected to the radio telephone via said charger, for recording and reproducing a voice signal; and
means, coupled between the base unit and the recording and reproduction means, for controlling transmission of said voice signal representing a telephone call from the base unit to the recording and reproducing means to be recorded therein.

10. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and removably connected to the radio telephone, for providing battery charging power to the radio telephone;
a recording and reproducing means, detachable from the base unit and the radio telephone, connected to the radio telephone via said charger and removably connected to the charger, for recording and reproducing a voice signal; and means, coupled between the base unit and the recording and reproduction means, for controlling transmission of said voice signal representing a telephone call from the base unit to the recording and reproducing means to be recorded therein.

11. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and electrically connectable to the radio telephone, for providing a charging power to the radio telephone;
a recording and reproducing means, detachable from the base unit and the radio telephone, and electrically connectable to the radio telephone, for recording and reproducing a voice signal;
means, coupled between the base unit and the recording and reproduction means, for controlling transmission of a voice signal representing a telephone call from a caller from the base unit to the recording and reproducing means to be recorded therein;
means, coupled between the base unit and the recording and reproducing means, for controlling transmission of said voice signal representing a telephone call from the base unit to the recording and reproducing means;
means in said charger for setting the system in an automatic answering mode; and
means for setting the system in a reproduction mode, wherein the recording and reproducing means is coupled to the automatic answering mode setting means and the reproduction mode setting means, and wherein the recording and reproducing means records said voice signal representing a telephone call during the time when the system is in the automatic answering mode, and reproduces said voice signal during the time when the system is in the reproduction mode.

12. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and electrically connectable to the radio telephone, for providing a charging power to the radio telephone;
a recording and reproducing means in said charger, detachable from the base unit and the radio telephone, and electrically connectable to the radio telephone, for recording and reproducing a voice signal;
means, coupled between the base unit and the recording and reproduction means, for controlling transmission of a voice signal representing a telephone call from a caller from the base unit to the recording and reproducing means to be recorded therein;
means, coupled between the base unit and the recording and reproducing means, for controlling transmission of said voice signal representing a telephone call from the base unit to the recording and reproducing means;
means for setting the system in an automatic answering mode; and
means for setting the system in a reproduction mode, wherein the recording and reproducing means is coupled to the automatic answering mode setting means and the reproduction mode setting means, and wherein the recording and reproducing means records said voice signal representing a telephone call during the time when the system is in the automatic answering mode, and reproduces said voice signal during the time when the system is in the reproduction mode.

13. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and electrically connectable to the radio telephone, for providing a charging power to the radio telephone;
a recording and reproducing means, being separated from said charger, connected to the radio telephone via the charger, and detachable from the base unit and the radio telephone, for recording and reproducing a voice signal;
means, coupled between the base unit and the recording and reproduction means, for controlling transmission of a voice signal representing a telephone call from a caller from the base unit to the recording and reproducing means to be recorded therein;
means, coupled between the base unit and the recording and reproducing means, for controlling transmission of said voice signal representing a telephone call from the base unit to the recording and reproducing means;
means for setting the system in an automatic answering mode; and
means for setting the system in a reproduction mode, wherein the recording and reproducing means is coupled to the automatic answering mode setting means and the reproduction mode setting means, and wherein the recording and reproducing means records said voice signal representing a telephone call during the time when the system is in the automatic answering mode, and reproduces said voice signal during the time when the system is in the reproduction mode.

14. A radio telephone system comprising:
a base unit coupled to a telephone subscriber line for receiving a voice signal representing a telephone call from a caller therefrom;
a radio telephone operable on battery power and wirelessly coupled to the base unit for communicating a voice signal therewith;
a charger, detachable from the base unit and the radio telephone, and removably connected to the radio telephone, for providing a charging power to the radio telephone;
a recording and reproducing means, removably connected to said charger, connected to the radio telephone via the charger and detachable from the base unit and the radio telephone, for recording and reproducing a voice signal;
means, coupled between the base unit and the recording and reproduction means, for controlling transmission of a voice signal representing a telephone call from a caller from the base unit to the recording and reproducing means to be recorded therein;

means, coupled between the base unit and the recording and reproducing means, for controlling transmission of said voice signal representing a telephone call from the base unit to the recording and reproducing means;

means for setting the system in an automatic answering mode; and means for setting the system in a reproduction mode, wherein the recording and reproducing means is coupled to the automatic answering mode setting means and the reproduction mode setting means, and wherein the recording and reproducing means records said voice signal representing a telephone call during the time when the system is in the automatic answering mode, and reproduces said voice signal during the time when the system is in the reproduction mode.

15. A radio telephone system comprising:

a base unit coupled to a telephone subscriber line for receiving a voice signal representing a telephone call from a caller therefrom;

a radio telephone operable on battery power and wirelessly coupled to the base unit for communicating a voice signal therewith;

a charger, detachable from the base unit and the radio telephone, and electrically connectable to the radio telephone, for providing a charging power to the radio telephone;

a recording and reproducing means, detachable from the base unit and the radio telephone, and electrically connectable to the radio telephone, for recording and reproducing a voice signal;

means, coupled between the base unit and the recording and reproduction means, for controlling transmission of a voice signal representing a telephone call from a caller from the base unit to the recording and reproducing means to be recorded therein;

means, coupled between the base unit and the recording and reproducing means, for controlling transmission of said voice signal representing a telephone call from the base unit to the recording and reproducing means;

means for setting the system in an automatic answering mode; and means in said charger for setting the system in a reproduction mode, wherein the recording and reproducing means is coupled to the automatic answering mode setting means and the reproduction mode setting means, and wherein the recording and reproducing means records said voice signal representing a telephone call during the time when the system is in the automatic answering mode, and reproduces said voice signal during the time when the system is in the reproduction mode.

16. The radio telephone device of claim 8, wherein the recording and reproducing means records and reproduces said voice signal representing a telephone call, and includes a speaker for producing a voice representing said reproduced voice signal.

17. The radio telephone system of claim 8, further comprising means for generating a predetermined message to the caller.

18. The radio telephone system of claim 17, wherein said message generating means is in the recording and reproducing means.

19. The radio telephone device of claim 17, wherein the message generating means is in the base unit.

* * * * *